(12) United States Patent
Kimani

(10) Patent No.: US 12,515,586 B2
(45) Date of Patent: Jan. 6, 2026

(54) SYSTEM AND METHOD FOR PROVIDING HAPTIC FEEDBACK TO INFLUENCE AN AFFECTIVE STATE

(71) Applicant: TOYOTA RESEARCH INSTITUTE, INC., Los Altos, CA (US)

(72) Inventor: Everlyne N. Kimani, Mountain View, CA (US)

(73) Assignees: TOYOTA RESEARCH INSTITUTE, INC., Los Altos, CA (US); TOYOTA JIDOSHA KABUSHIKA KAISHA, Aichi-Ken (JP)

( * ) Notice: Subject to any disclaimer, the term of this patent is extended or adjusted under 35 U.S.C. 154(b) by 45 days.

(21) Appl. No.: 18/582,500

(22) Filed: Feb. 20, 2024

(65) Prior Publication Data

US 2025/0263013 A1    Aug. 21, 2025

(51) Int. Cl.
*B60K 28/02* (2006.01)
*A61B 5/00* (2006.01)
(Continued)

(52) U.S. Cl.
CPC .............. *B60Q 9/00* (2013.01); *A61B 5/0002* (2013.01); *A61B 5/0816* (2013.01);
(Continued)

(58) Field of Classification Search
CPC ...... G02B 2027/0138; G02B 2027/014; G02B 2027/0178; G02B 27/0093; G02B 27/017; G02B 27/0172; G02B 1/00; G02B 3/00; G02B 5/00; G02B 6/00; G02B 7/00; G02B 9/00; G02B 13/00; G02B 15/00; G02B 17/00; G02B 19/00; G02B 21/00; G02B 23/00; G02B 25/00; G02B 26/00; G02B 27/00; G02B 30/00; G02B 2207/00;
(Continued)

(56) References Cited

U.S. PATENT DOCUMENTS 9,104,271 B1 *   8/2015   Adams .................. G06F 3/0233
10,403,050 B1 *  9/2019   Beall ....................... G06T 7/292
(Continued)

FOREIGN PATENT DOCUMENTS

DE    202020103047 U1    6/2020

OTHER PUBLICATIONS

Lee et al., AmbientBreath: Unobtrusive Just-in-time Breathing Intervention Using Multi-sensory Stimulation and its Evaluation in a Car Simulator; Proc. ACM Interact. Mob. Wearable Ubiquitous Technol., vol. 5, No. 2, Article 71, Jun. 2021.
(Continued)

*Primary Examiner* — Daniel Previl
(74) *Attorney, Agent, or Firm* — Seyfarth Shaw LLP

(57) ABSTRACT

A method for regulating an affective state of a driver includes transmitting, to a remote monitoring system, vital sign data of the driver in accordance with monitoring one or more vital signs of the driver. The method also includes receiving, from the remote monitoring system, haptic feedback data in accordance with a vital sign, of the one or more vital signs, satisfying a stimulation condition, the haptic feedback data indicating a vital sign pattern of a remote instructor. The method additionally includes providing haptic feedback to the driver in accordance with receiving the haptic feedback data.

20 Claims, 7 Drawing Sheets

(51) Int. Cl.
  *A61B 5/08*  (2006.01)
  *B60Q 9/00*  (2006.01)
  *G09B 19/16* (2006.01)

(52) U.S. Cl.
  CPC .......... *A61B 5/6801* (2013.01); *A61B 5/6893* (2013.01); *A61B 5/7455* (2013.01); *G09B 19/167* (2013.01); *A61B 2503/22* (2013.01)

(58) Field of Classification Search
  CPC ........ G06F 21/316; G06F 21/32; G06F 21/64; G06F 2203/011; G06F 3/012; G06F 3/013; G06F 3/017; G06F 3/0304; G06F 3/04817; G06F 3/0482; G06F 1/00; G06F 3/00; G06F 5/00; G06F 7/00; G06F 8/00; G06F 9/00; G06F 11/00; G06F 12/00; G06F 13/00; G06F 15/00; G06F 16/00; G06F 17/00; G06F 18/00; G06F 21/00; G06F 30/00; G06F 40/00; G06F 2101/00; G06F 2111/00; G06F 2113/00; G06F 2115/00; G06F 2117/00; G06F 2119/00; G06F 2123/00; G06F 2200/00; G06F 2203/00; G06F 2201/00; G06F 2205/00; G06F 2206/00; G06F 2207/00; G06F 2209/00; G06F 2211/00; G06F 2212/00; G06F 2213/00; G06F 2216/00; G06F 2218/00; G06F 2219/00; G06F 2221/00; G06T 19/006; G06T 1/00; G06T 3/00; G06T 5/00; G06T 7/00; G06T 9/00; G06T 11/00; G06T 13/00; G06T 15/00; G06T 19/00; G06T 17/00; G06T 2200/00; G06T 2201/00; G06T 2207/00; G06T 2210/00; G06T 2211/00; G06T 2215/00; G06T 2213/00; G06T 2219/00; G06V 40/19; G06V 40/193; G06V 40/197; G06V 10/00; G06V 20/00; G06V 30/00; G06V 40/00; G06V 2201/00; H04L 63/0861; H04L 1/00; H04L 5/00; H04L 7/00; H04L 9/00; H04L 12/00; H04L 13/00; H04N 23/90; H04N 5/44504; H04N 1/00; H04N 3/00; H04N 5/00; H04N 21/00; H04N 19/00; H04N 17/00; H04N 2209/00; H04N 2213/00; H04N 2201/00; H04W 12/065; H04W 12/33; H04W 4/00; H04W 8/00; H04W 12/00; H04W 16/00; H04W 99/00; H04W 92/00; H04W 88/00; H04W 84/00; H04W 80/00; H04W 76/00; H04W 74/00
  USPC ...... 340/576, 665, 683, 686.6, 691.2, 691.6, 340/693.8, 3.1, 3.9, 825.19, 825.29, 5.22, 340/5.23, 5.83, 7.6, 582
  See application file for complete search history.

(56) References Cited

U.S. PATENT DOCUMENTS

| | | | | |
|---|---|---|---|---|
| 11,179,082 | B2* | 11/2021 | Yamada | B60W 40/08 |
| 2004/0032395 | A1* | 2/2004 | Goldenberg | G06F 3/0485 |
| | | | | 345/156 |
| 2015/0005647 | A1* | 1/2015 | Gabbay | A61B 5/0205 |
| | | | | 600/484 |
| 2016/0354026 | A1* | 12/2016 | Zohar | B60N 2/976 |
| 2019/0290193 | A1* | 9/2019 | Hayik | A61B 5/002 |
| 2019/0314599 | A1* | 10/2019 | Schneider | G06F 17/00 |
| 2020/0401938 | A1* | 12/2020 | Etkin | G06N 5/022 |
| 2022/0096317 | A1* | 3/2022 | Smith | A61H 23/004 |
| 2023/0241491 | A1* | 8/2023 | Stafford | G02B 27/0101 |
| | | | | 463/30 |
| 2024/0070251 | A1* | 2/2024 | Maizels | G10L 13/02 |

OTHER PUBLICATIONS

Blunder, Force Measurement for Control Units for Driver Observation; Defensive Publications Series, Sep. 2020.
Liu et al., Toward Nonintrusive Camera-Based Heart Rate Variability Estimation in the Car Under Naturalistic Condition; IEEE Internet of Things Journal, vol. 9, No. 14, Jul. 15, 2022.

* cited by examiner

SYSTEM AND METHOD FOR PROVIDING HAPTIC FEEDBACK TO INFLUENCE AN AFFECTIVE STATE

BACKGROUND

Field

Certain aspects of the present disclosure generally relate to driver training and, more specifically, to systems and methods for providing haptic feedback to influence an affective state.

Background

Haptic feedback refers to the tactile or touch-based sensations and/or cues provided by one or more electronic devices to users. Haptic feedback involves the use of vibrations, forces, or motions to simulate the sense of touch, enhancing the user experience by creating physical interactions between the user and a digital interface. Devices such as smartphones, game controllers, and wearables use haptic feedback to convey information or responses, such as confirming a button press, simulating textures or surfaces, or providing alerts and notifications through subtle vibrations or motions. This sensory feedback creates a more immersive and intuitive interaction, allowing users to perceive and respond to digital stimuli through physical sensations.

Conventional systems use various ways to monitor physiological and psychological arousal states. For example, wearable devices equipped with heart rate monitors and accelerometers can track physiological indicators, providing real-time data on stress levels. Heart-rate monitors may analyze variations in an individual's heart rate to infer stress levels. By continuously tracking the heart's beats per minute (bpm) and assessing patterns, deviations, and/or irregularities from a baseline, specialized techniques can identify potential stress indicators. Other vital signs, such as breathing patterns, pupil dilation, blood pressure, muscle tension, skin conductance, and perspiration, may indicate stress levels. Smart wearables may monitor these vital signs to infer and assess user stress.

SUMMARY

In one aspect of the present disclosure, a method for regulating an affective state of a driver includes transmitting, to a remote monitoring system, vital sign data of the driver in accordance with monitoring one or more vital signs of the driver. The method also includes receiving, from the remote monitoring system, haptic feedback data in accordance with a vital sign, of the one or more vital signs, satisfying a stimulation condition, the haptic feedback data indicating a vital sign pattern of a remote instructor. The method additionally includes providing haptic feedback to the driver in accordance with receiving the haptic feedback data.

Another aspect of the present disclosure is directed to an apparatus for regulating an affective state of a driver, including means for transmitting, to a remote monitoring system, vital sign data of the driver in accordance with monitoring one or more vital signs of the driver. The apparatus also includes means for receiving, from the remote monitoring system, haptic feedback data in accordance with a vital sign, of the one or more vital signs, satisfying a stimulation condition, the haptic feedback data indicating a vital sign pattern of a remote instructor. The apparatus further includes means for providing haptic feedback to the driver in accordance with receiving the haptic feedback data.

In another aspect of the present disclosure, a non-transitory computer-readable medium with non-transitory program code recorded thereon for regulating an affective state of a driver is disclosed. The program code is executed by a processor and includes program code to transmit, to a remote monitoring system, vital sign data of the driver in accordance with monitoring one or more vital signs of the driver. The program code further includes program code to receive, from the remote monitoring system, haptic feedback data in accordance with a vital sign, of the one or more vital signs, satisfying a stimulation condition, the haptic feedback data indicating a vital sign pattern of a remote instructor. The program code further includes program code to provide haptic feedback to the driver in accordance with receiving the haptic feedback data.

Another aspect of the present disclosure is directed to an apparatus for regulating an affective state of a driver. The apparatus includes one or more memories coupled with the one or more processors and storing instructions operable, when executed by the one or more processors, to cause the apparatus to transmit, to a remote monitoring system, vital sign data of the driver in accordance with monitoring one or more vital signs of the driver. Execution of the instructions also cause the apparatus to receive, from the remote monitoring system, haptic feedback data in accordance with a vital sign, of the one or more vital signs, satisfying a stimulation condition, the haptic feedback data indicating a vital sign pattern of a remote instructor. Execution of the instructions further cause the apparatus to provide haptic feedback to the driver in accordance with receiving the haptic feedback data.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1A:
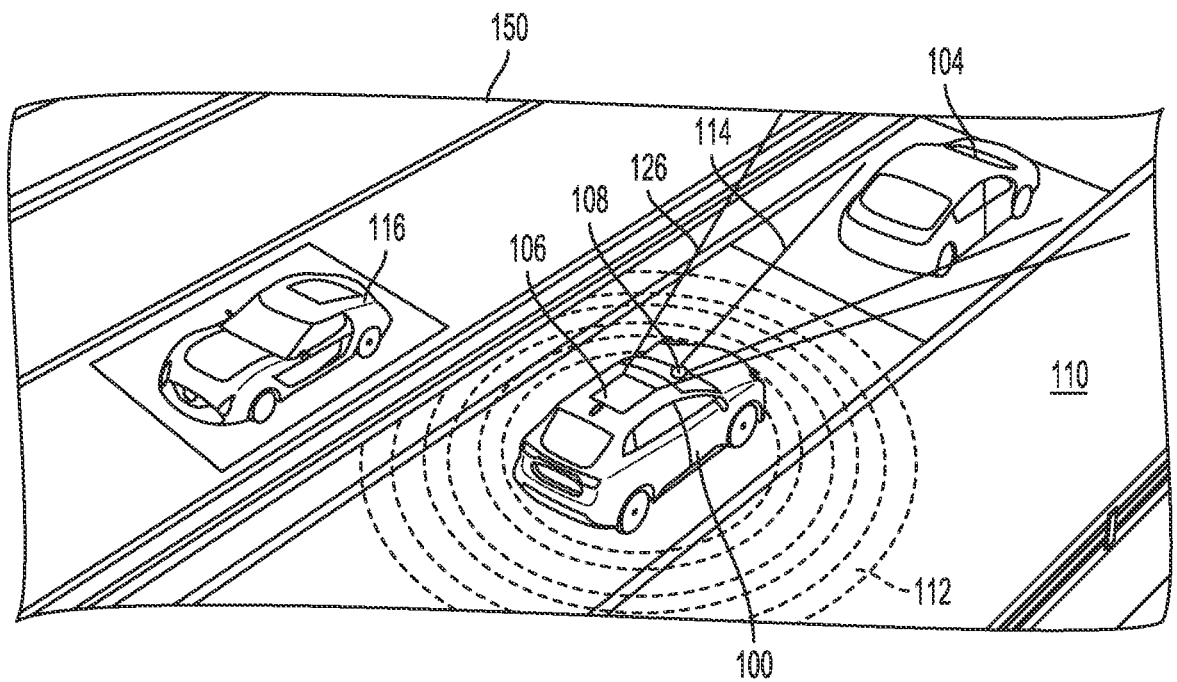
FIG. 1A is a diagram illustrating an example of a vehicle in an environment, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of haptic feedback systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

Conventional driver training systems rely on a human instructor to provide guidance during driver training sessions. In these systems, a driving instructor sits in the passenger seat of a training vehicle and verbally provides feedback to a student in the driver seat. One aspect of this feedback involves addressing the driver's affective state. For instance, if the driver becomes anxious or excited, the instructor may instruct the driver to calm down and regain control.

However, verbal feedback directly addressing emotions often yields limited results, as people typically do not respond well to such verbal instructions. For example, when told to "calm down," individuals may instead experience heightened anxiety. The instructor's physical presence next to the driver may also increase a driver's anxiety, as some drivers might become distracted, more self-aware, or intimidated by the teacher.

Various aspects of the present disclosure are directed to a method for regulating a driver's emotional state during training via a remote instructor. In some examples, a local monitoring system tracks a student driver's vital sign data. For example, the local monitoring system may track one or more vital signs of a driver, such as heart rate, pupil dilation, breathing patterns, blood pressure, muscle tension, skin conductance, or perspiration levels. If any of these vital signs satisfy a stimulation condition, the local monitoring system may then transmit an indication to a remote monitoring system associated with a driving instructor. The stimulation condition may be satisfied based on one or more vitals signs being above or below a respective baseline and/or determining an abnormal condition. Of course, other criteria are contemplated for satisfying the stimulation condition. In one example, the stimulation condition is satisfied if the driver's heart rate exceeds a beat per minute (BPM) threshold. Additionally, or alternatively, the stimulation condition may be satisfied if the driver's breathing pattern becomes irregular.

Once the remote monitoring system receives the indication, the driving instructor can respond by initiating haptic feedback. The haptic feedback may mimic one or more vital signs of the instructor. For example, the driving instructor may demonstrate a controlled breathing technique. The system translates the instructor's vital signs, such as breathing patterns, into the haptic feedback pattern (e.g., vibration pattern). The haptic feedback pattern may then be imparted on the driver via a haptic feedback device in the driver's chair, headrest, or attire (e.g., a haptic feedback vest). As the driver receives the haptic feedback provided by the instructor, the driver may naturally synchronize one or more physical conditions, such as their breathing pattern, with the haptic feedback pattern received from the remote instructor. As such, the driver may effectively mirror the instructor's vital sign pattern, such as the instructor's breathing pattern. This process facilitates a calming effect and helps the driver regulate their affective state, promoting a sense of focus and composure behind the wheel. Various aspects of the present disclosure are not limited to regulating the affective state of the driver of a car. Such aspects are also contemplated for remotely regulating the affective state of other people. Such people include, but are not limited to, pilots, astronauts, boat captains, or other people in stress inducing situations.

Particular aspects of the subject matter described in this disclosure can be implemented to realize one or more of the following potential advantages. In some examples, the described techniques, such as providing haptic feedback to an anxious driver, enables an instructor to deliver interventions for emotional regulation during training sessions. Other advantages include techniques for enabling an instructor to communicate with a driver from a remote location, as well as techniques for enhancing safety and performance during the training process.

FIG. 1A is a diagram illustrating an example of a vehicle 100 in an environment 150, in accordance with various aspects of the present disclosure. In the example of FIG. 1A, the vehicle 100 may be an autonomous vehicle, a semi-autonomous vehicle, or a non-autonomous vehicle. As shown in FIG. 1A, the vehicle 100 may be traveling on a road 110. A first vehicle 104 may be ahead of the vehicle 100 and a second vehicle 116 may be adjacent to the vehicle 100. In this example, the vehicle 100 may include a 2D camera 108, such as a 2D red-green-blue (RGB) camera, and a LIDAR sensor 106. Other sensors, such as RADAR and/or ultrasound, are also contemplated. Additionally, or alternatively, although not shown in FIG. 1A, the vehicle 100 may include one or more additional sensors, such as a camera, a RADAR sensor, and/or a LIDAR sensor, integrated with the vehicle in one or more locations, such as within one or more storage locations (e.g., a trunk). Additionally, or alternatively, although not shown in FIG. 1A, the vehicle 100 may include one or more force measuring sensors.

In one configuration, the 2D camera 108 captures a 2D image that includes objects in the 2D camera's 108 field of view 114. The LIDAR sensor 106 may generate one or more output streams. The first output stream may include a 3D cloud point of objects in a first field of view, such as a 360° field of view 112 (e.g., bird's eye view). The second output stream 124 may include a 3D cloud point of objects in a second field of view, such as a forward-facing field of view 126.

The 2D image captured by the 2D camera includes a 2D image of the first vehicle 104, as the first vehicle 104 is in the 2D camera's 108 field of view 114. As is known to those of skill in the art, a LIDAR sensor 106 uses laser light to sense the shape, size, and position of objects in the environment 150. The LIDAR sensor 106 may vertically and horizontally scan the environment 150. In the current example, the artificial neural network (e.g., autonomous driving system) of the vehicle 100 may extract height and/or depth features from the first output stream. In some examples, an autonomous driving system of the vehicle 100 may also extract height and/or depth features from the second output stream.

The information obtained from the sensors 106, 108 may be used to evaluate a driving environment. Additionally, or alternatively, information obtained from one or more sensors that monitor objects within the vehicle 100 and/or forces generated by the vehicle 100 may be used to generate notifications when an object may be damaged based on actual, or potential, movement.

Figure 1B:
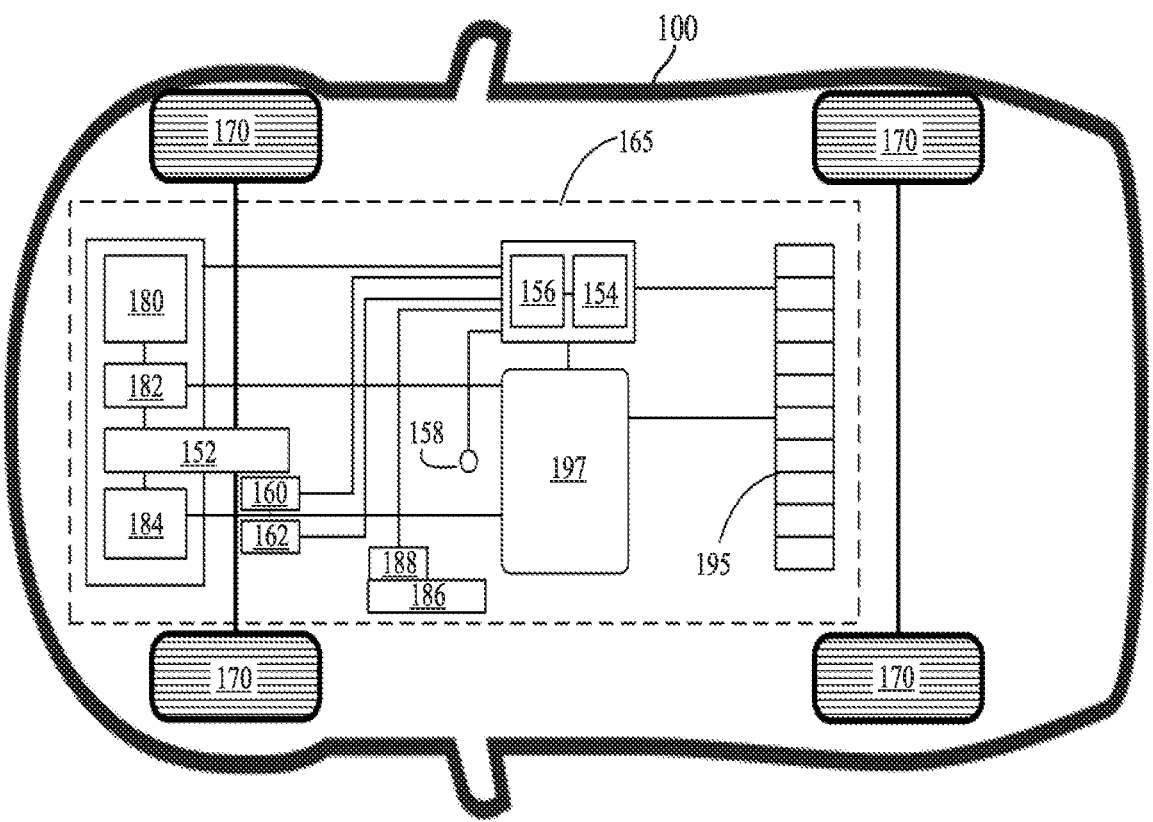
FIG. 1B is a diagram illustrating an example of a vehicle, in accordance with various aspects of the present disclosure.

FIG. 1B is a diagram illustrating an example the vehicle 100, in accordance with various aspects of the present disclosure. It should be understood that various aspects of the present disclosure may be applicable to/used in various vehicles (internal combustion engine (ICE) vehicles, fully electric vehicles (EVs), etc.) that are fully or partially autonomously controlled/operated, and as noted above, even in non-vehicular contexts, such as, e.g., shipping container packing.

The vehicle 100 may include drive force unit 165 and wheels 170. The drive force unit 165 may include an engine 180, motor generators (MGs) 182 and 184, a battery 195, an inverter 197, a brake pedal 186, a brake pedal sensor 188, a transmission 152, a memory 154, an electronic control unit (ECU) 156, a shifter 158, a speed sensor 160, and an accelerometer 162.

The engine 180 primarily drives the wheels 170. The engine 180 can be an ICE that combusts fuel, such as gasoline, ethanol, diesel, biofuel, or other types of fuels which are suitable for combustion. The torque output by the engine 180 is received by the transmission 152. MGs 182 and 184 can also output torque to the transmission 152. The engine 180 and MGs 182 and 184 may be coupled through a planetary gear (not shown in FIG. 1B). The transmission 152 delivers an applied torque to one or more of the wheels 170. The torque output by engine 180 does not directly translate into the applied torque to the one or more wheels 170.

MGs 182 and 184 can serve as motors which output torque in a drive mode, and can serve as generators to recharge the battery 195 in a regeneration mode. The electric power delivered from or to MGs 182 and 184 passes through the inverter 197 to the battery 195. The brake pedal sensor 188 can detect pressure applied to brake pedal 186, which may further affect the applied torque to wheels 170. The speed sensor 160 is connected to an output shaft of transmission 152 to detect a speed input which is converted into a vehicle speed by ECU 156. The accelerometer 162 is connected to the body of vehicle 100 to detect the actual deceleration of vehicle 100, which corresponds to a deceleration torque.

The transmission 152 may be a transmission suitable for any vehicle. For example, transmission 152 can be an electronically controlled continuously variable transmission (ECVT), which is coupled to engine 180 as well as to MGs 91 and 92. Transmission 20 can deliver torque output from a combination of engine 180 and MGs 91 and 92. The ECU 156 controls the transmission 152, utilizing data stored in memory 154 to determine the applied torque delivered to the wheels 170. For example, ECU 156 may determine that at a certain vehicle speed, engine 180 should provide a fraction of the applied torque to the wheels 170 while one or both of the MGs 182 and 184 provide most of the applied torque. The ECU 156 and transmission 152 can control an engine speed (NE) of engine 180 independently of the vehicle speed (V).

The ECU 156 may include circuitry to control the above aspects of vehicle operation. Additionally, the ECU 156 may include, for example, a microcomputer that includes a one or more processing units (e.g., microprocessors), memory storage (e.g., RAM, ROM, etc.), and I/O devices. The ECU 156 may execute instructions stored in memory to control one or more electrical systems or subsystems in the vehicle. Furthermore, the ECU 156 can include one or more electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., anti-lock braking system (ABS) or electronic stability control (ESC)), battery management systems, and so on. These various control units can be implemented using two or more separate electronic control units or using a single electronic control unit.

The MGs 182 and 184 each may be a permanent magnet type synchronous motor including, for example, a rotor with a permanent magnet embedded therein. The MGs 182 and 184 may each be driven by an inverter controlled by a control signal from ECU 156 so as to convert direct current (DC) power from the battery 195 to alternating current (AC) power, and supply the AC power to the MGs 182 and 184. In some examples, a first MG 182 may be driven by electric power generated by a second MG 184. It should be understood that in embodiments where MGs 182 and 184 are DC motors, no inverter is required. The inverter, in conjunction with a converter assembly may also accept power from one or more of the MGs 182 and 184 (e.g., during engine charging), convert this power from AC back to DC, and use this power to charge battery 195 (hence the name, motor generator). The ECU 156 may control the inverter, adjust driving current supplied to the first MG 182, and adjust the current received from the second MG 184 during regenerative coasting and braking.

The battery 195 may be implemented as one or more batteries or other power storage devices including, for example, lead-acid batteries, lithium ion, and nickel batteries, capacitive storage devices, and so on. The battery 195 may also be charged by one or more of the MGs 182 and 184, such as, for example, by regenerative braking or by coasting during which one or more of the MGs 182 and 184 operates as generator. Alternatively or additionally, the battery 195 can be charged by the first MG 182, for example, when vehicle 100 is in idle (not moving/not in drive). Further still, the battery 195 may be charged by a battery charger (not shown) that receives energy from engine 180. The battery charger may be switched or otherwise controlled to engage/disengage it with battery 195. For example, an alternator or generator may be coupled directly or indirectly to a drive shaft of engine 180 to generate an electrical current as a result of the operation of engine 180. Still other embodiments contemplate the use of one or more additional motor generators to power the rear wheels of the vehicle 100 (e.g., in vehicles equipped with 4-Wheel Drive), or using two rear motor generators, each powering a rear wheel.

The battery 195 may also power other electrical or electronic systems in the vehicle 100. In some examples, the battery 195 can include, for example, one or more batteries, capacitive storage units, or other storage reservoirs suitable for storing electrical energy that can be used to power one or both of the MGs 182 and 184. When the battery 195 is implemented using one or more batteries, the batteries can include, for example, nickel metal hydride batteries, lithium ion batteries, lead acid batteries, nickel cadmium batteries, lithium ion polymer batteries, and other types of batteries.

Figure 2:
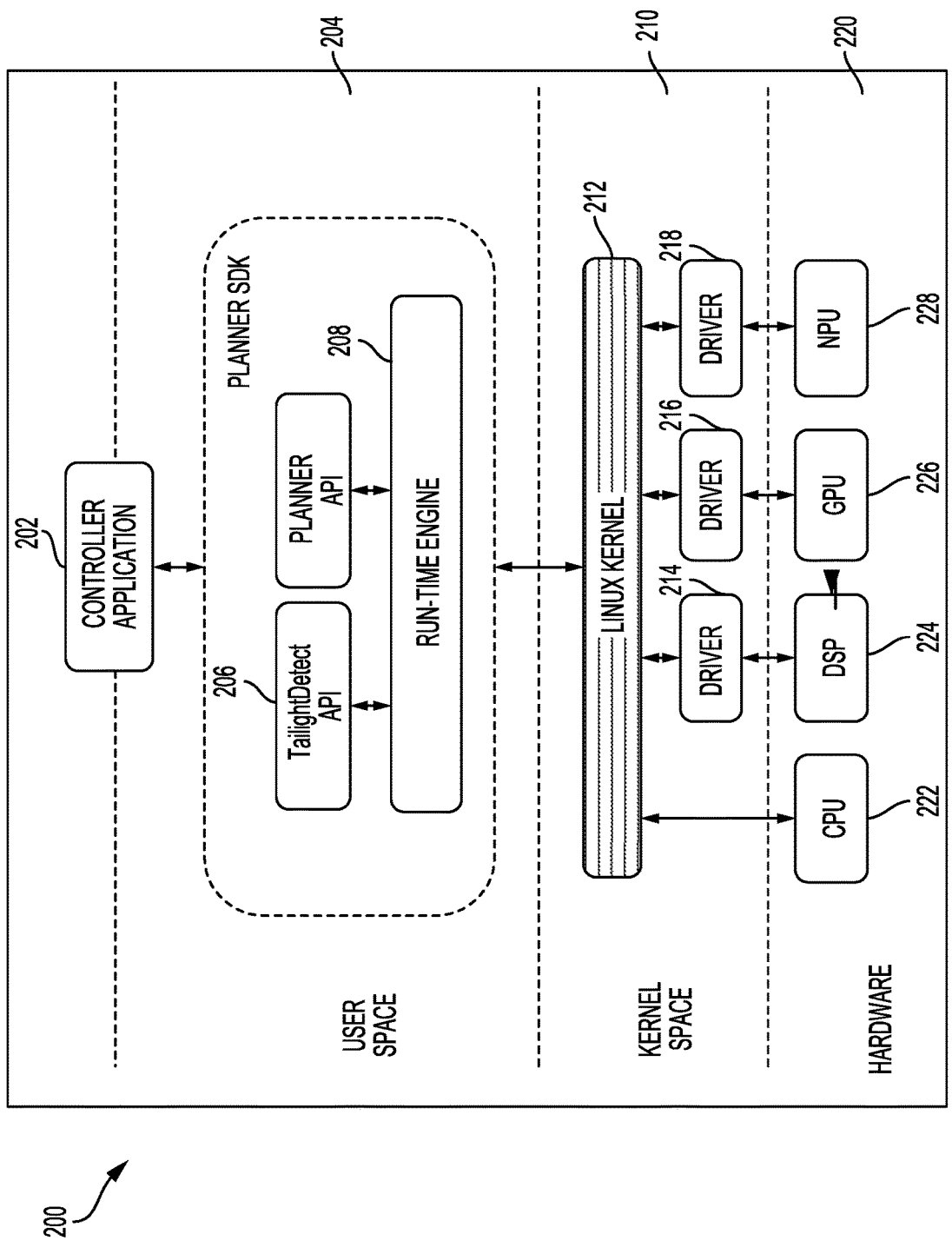
FIG. 2 is a block diagram illustrating a software architecture that may modularize artificial intelligence (AI) functions for planning and control of an autonomous agent, in accordance with various aspects of the present disclosure.

FIG. 2 is a block diagram illustrating a software architecture 200 that may modularize artificial intelligence (AI) functions for planning and/or controlling one or more actions of the vehicle 100, according to aspects of the present disclosure. Using the architecture, a controller application 202 may be designed such that it may cause various processing blocks of a system-on-chip (SOC) 220 (for example a central processing unit (CPU) 222, a digital signal processor (DSP) 224, a graphics processing unit (GPU) 226 and/or an network processing unit (NPU) 228) to perform supporting computations during run-time operation of the controller application 202.

The controller application 202 may be configured to call functions defined in a user space 204. The controller application 202 may make a request to compile program code associated with a library defined in a taillight prediction application programming interface (API) 206 to perform taillight recognition of a vehicle. This request may ultimately rely on the output of a convolutional neural network configured to focus on portions of the sequence of images critical to vehicle taillight recognition.

A run-time engine 208, which may be compiled code of a runtime framework, may be further accessible to the controller application 202. The controller application 202 may cause the run-time engine 208, for example, to take actions for controlling the autonomous agent. When a vehicle is detected within a predetermined distance of the autonomous agent, the run-time engine 208 may in turn send a signal to an operating system 210, such as a Linux Kernel 212, running on the SOC 220. The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, the deep neural network may be configured to run on a combination of processing blocks, such as the CPU 222 and the GPU 226, or may be run on the NPU 228, if present.

Figure 3:
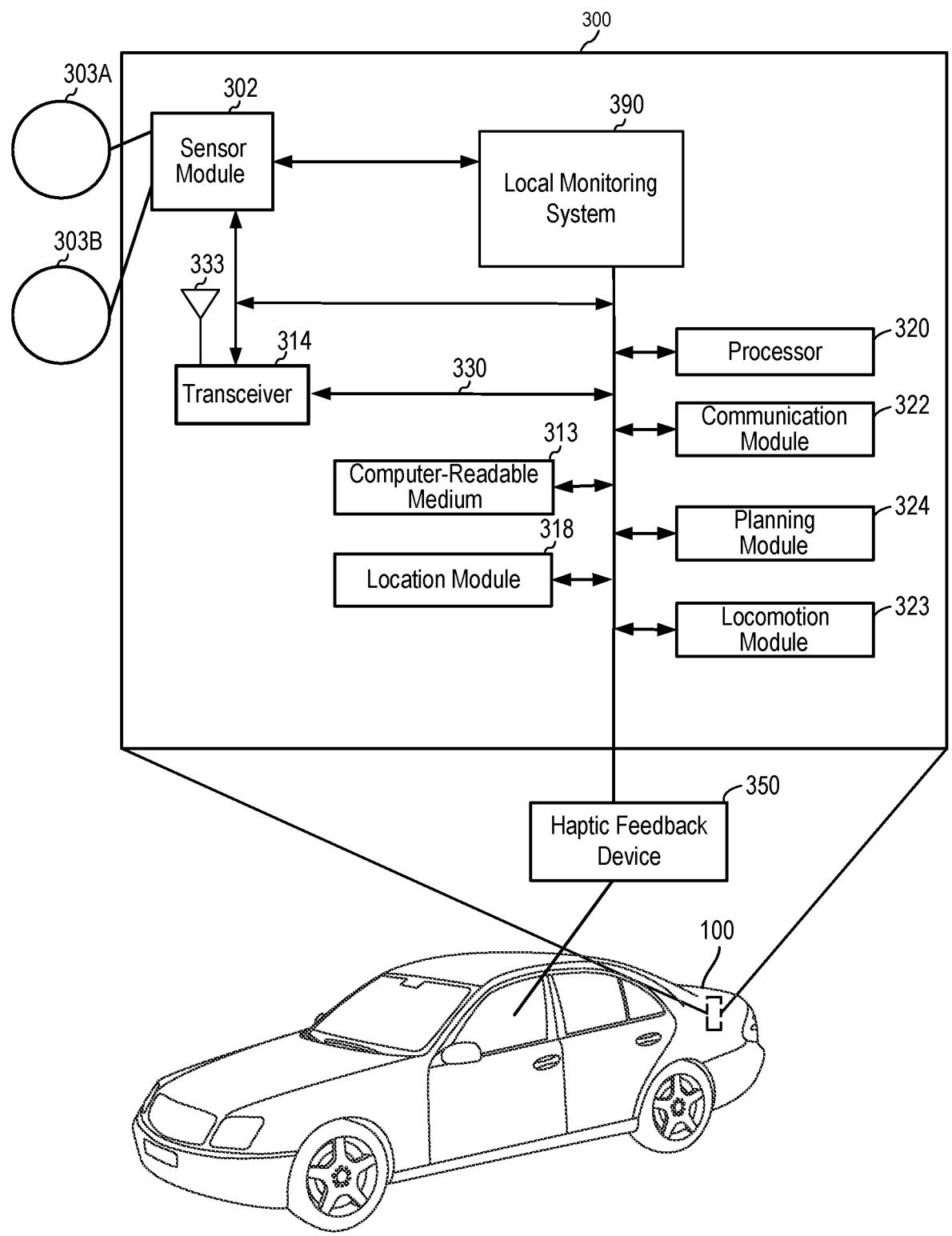
FIG. 3 is a diagram illustrating an example of a hardware implementation for a vehicle control system, in accordance with various aspects of the present disclosure.

FIG. 3 is a diagram illustrating an example of a hardware implementation for a vehicle control system 300, according to aspects of the present disclosure. The vehicle control system 300 may be a component of a vehicle, a robotic device, or other device. For example, as shown in FIG. 3, the vehicle control system 300 is a component of a vehicle 100. Aspects of the present disclosure are not limited to the vehicle control system 300 being a component of the vehicle 100, as other devices, such as a bus, boat, drone, or robot, are also contemplated for using the vehicle control system 300. In the example of FIG. 3, the vehicle system may include a local monitoring system 390. In some examples, the local monitoring system 390 is configured to perform operations, including operations of the process 600 described with reference to FIG. 6.

The vehicle control system 300 may be implemented with a bus architecture, represented generally by a bus 330. The bus 330 may include any number of interconnecting buses and bridges depending on the specific application of the vehicle control system 300 and the overall design constraints. The bus 330 links together various circuits including one or more processors and/or hardware modules, represented by a processor 320, a communication module 322, a location module 318, a sensor module 302, a locomotion module 323, a planning module 324, and a computer-readable medium 313. The bus 330 may also link various other circuits such as timing sources, peripherals, voltage regulators, and power management circuits, which are well known in the art, and therefore, will not be described any further.

The vehicle control system 300 includes a transceiver 314 coupled to the processor 320, the sensor module 302, a comfort module 308, the communication module 322, the location module 318, the locomotion module 323, the planning module 324, and the computer-readable medium 313. The transceiver 314 is coupled to an antenna 333. The transceiver 314 communicates with various other devices over a transmission medium. For example, the transceiver 314 may receive commands via transmissions from a user or a remote device. As another example, the transceiver 314 may transmit driving statistics and information from the comfort module 308 to a server (not shown).

In one or more arrangements, one or more of the modules 302, 313, 314, 318, 320, 322, 323, 324, 390, can include artificial or computational intelligence elements, such as, neural network, fuzzy logic or other machine learning algorithms. Further, in one or more arrangements, one or more of the modules 302, 313, 314, 318, 320, 322, 323, 324, 390 can be distributed among multiple modules 302, 313, 314, 318, 320, 322, 323, 324, 390 described herein. In one or more arrangements, two or more of the modules 302, 313, 314, 318, 320, 322, 323, 324, 390 of the vehicle control system 300 can be combined into a single module.

The vehicle control system 300 includes the processor 320 coupled to the computer-readable medium 313. The processor 320 performs processing, including the execution of software stored on the computer-readable medium 313 providing functionality according to the disclosure. The software, when executed by the processor 320, causes the vehicle control system 300 to perform the various functions described for a particular device, such as the vehicle 328, or any of the modules 302, 313, 314, 318, 320, 322, 323, 324, 390. The computer-readable medium 313 may also be used for storing data that is manipulated by the processor 320 when executing the software.

The sensor module 302 may be used to obtain measurements via different sensors, such as a first sensor 303A and a second sensor 303B. The first sensor 303A and/or the second sensor 303B may be a vision sensor, such as a stereoscopic camera or a red-green-blue (RGB) camera, for capturing 2D images. In some examples, one or both of the first sensor 303A or the second sensor 303B may be used to identify an intersection, a crosswalk, or another stopping location. Additionally, or alternatively, one or both of the first sensor 303A or the second sensor 303B may identify objects within a range of the vehicle 100. In some examples, one or both of the first sensor 303A or the second sensor 303B may identify a pedestrian or another object in a crosswalk. The first sensor 303A and the second sensor 303B are not limited to vision sensors as other types of sensors, such as, for example, light detection and ranging (LiDAR), a radio detection and ranging (radar), sonar, and/or lasers are also contemplated for either of the sensors 303A, 303B. In some examples, the first sensor 303A and/or the second sensor 303B may include an internal sensor (e.g., within a cabin of the vehicle 100) to monitor the driver.

The measurements of the first sensor 303A and the second sensor 303B may be processed by one or more of the processor 320, the sensor module 302, the comfort module 308, the communication module 322, the location module 318, the locomotion module 323, the planning module 324, in conjunction with the computer-readable medium 313 to implement the functionality described herein. In one configuration, the data captured by the first sensor 303A and the second sensor 303B may be transmitted to an external device via the transceiver 314. The first sensor 303A and the second sensor 303B may be coupled to the vehicle 328 or may be in communication with the vehicle 328.

Additionally, the sensor module 302 may configure the processor 320 to obtain or receive information from the one or more sensors 303A and 303B. The information may be in the form of one or more two-dimensional (2D) image(s) and may be stored in the computer-readable medium 313 as sensor data. In the case of 2D, the 2D image is, for example, an image from the one or more sensors 303A and 303B that encompasses a field-of-view about the vehicle 100 of at least a portion of the surrounding environment, sometimes referred to as a scene. That is, the image is, in one approach, generally limited to a subregion of the surrounding environment. As such, the image may be of a forward-facing (e.g., the direction of travel) 30, 90, 120-degree field-of-view (FOV), a rear/side facing FOV, or some other subregion as defined by the characteristics of the one or more sensors 303A and 303B. In further aspects, the one or more sensors 303A and 303B may be an array of two or more cameras that capture multiple images of the surrounding environment and stitch the images together to form a comprehensive 330-degree view of the surrounding environment. In other examples, the one or more images may be paired stereoscopic images captured from the one or more sensors 303A and 303B having stereoscopic capabilities.

The location module 318 may be used to determine a location of the vehicle 328. For example, the location module 318 may use a global positioning system (GPS) to determine the location of the vehicle 328. The communication module 322 may be used to facilitate communications via the transceiver 314. For example, the communication module 322 may be configured to provide communication capabilities via different wireless protocols, such as Wi-Fi, long term evolution (LTE), 3G, etc. The communication module 322 may also be used to communicate with other components of the vehicle 328 that are not modules of the vehicle control system 300. Additionally, or alternatively, the communication module 322 may be used to communicate with an occupant of the vehicle 100. Such communications may be facilitated via audio feedback from an audio system of the vehicle 100, visual feedback via a visual feedback system of the vehicle, and/or haptic feedback via a haptic feedback device of the vehicle.

The locomotion module 323 may be used to facilitate locomotion of the vehicle 328. As an example, the locomotion module 323 may control movement of the wheels. As another example, the locomotion module 323 may be in communication with a power source of the vehicle 328, such as an engine or batteries. Of course, aspects of the present disclosure are not limited to providing locomotion via wheels and are contemplated for other types of components for providing locomotion, such as propellers, treads, fins, and/or jet engines.

The vehicle control system 300 also includes the planning module 324 for planning a route or controlling the locomotion of the vehicle 328, via the locomotion module 323. A route may be planned to a passenger based on compartment data provided via the comfort module 308. In one configuration, the planning module 324 overrides the user input when the user input is expected (e.g., predicted) to cause a collision. The modules may be software modules running in the processor 320, resident/stored in the computer-readable medium 313, one or more hardware modules coupled to the processor 320, or some combination thereof.

As shown in the example of FIG. 3, the vehicle 100 may include a haptic feedback device 350. The haptic feedback device 350 may be embedded in, or affixed to, a wearable device, such as a driver's vest or wristwatch. In some examples, the haptic feedback device 350 may be coupled to a structure in a vehicle. For example, the haptic feedback device 350 may be affixed to a portion of a seatbelt or embedded in a seat. The haptic feedback device 350 may provide tactile or touch sensation generated by electronic devices, providing physical feedback to a user through vibrations or other sensations. It is also contemplated that the haptic feedback device 350 may implement additional components suitable for conveying media. For example, the haptic feedback device 350 may include a speaker to create sound or a screen for displaying images.

Figure 5:
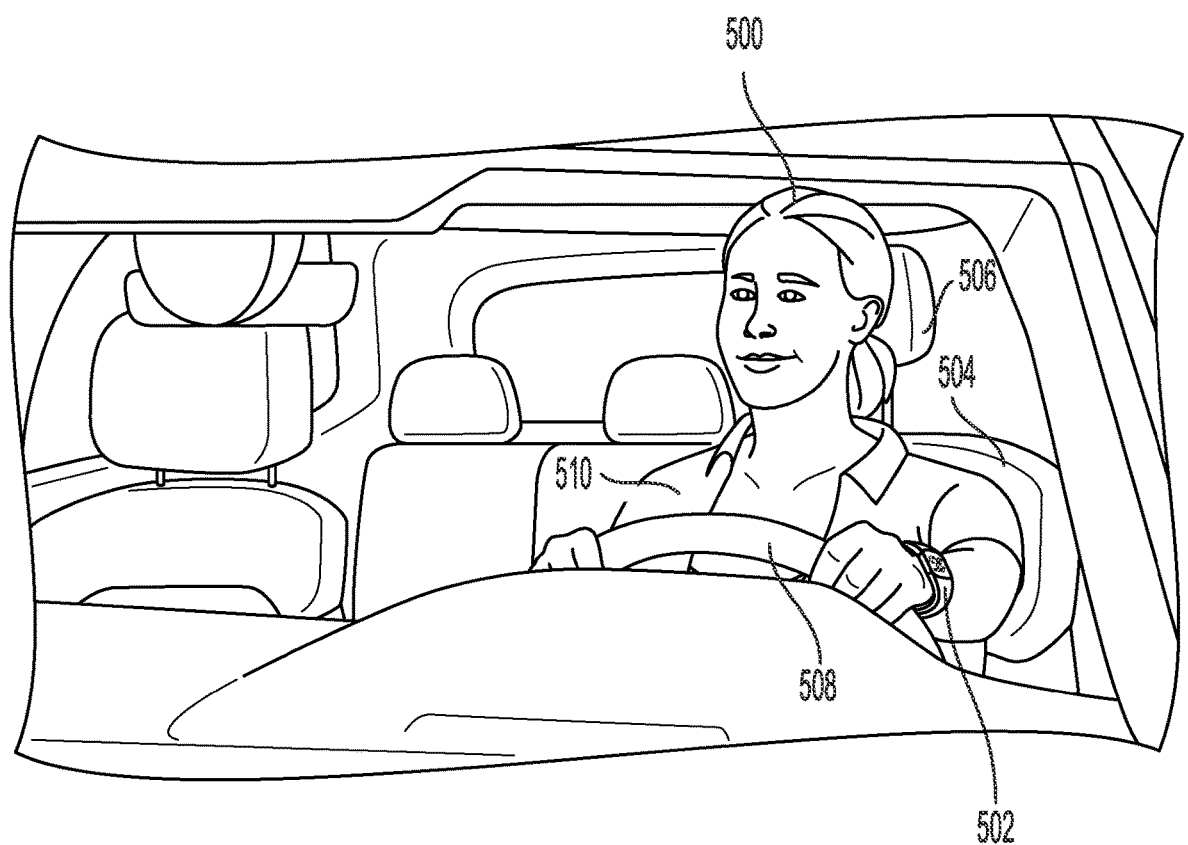
FIG. 5 illustrates an example of a driver wearing a vital monitoring device, in accordance with aspects of the present disclosure.

The local monitoring system 390 may include or be in communication with the sensor module 302, the transceiver 314, the processor 320, the communication module 322, the location module 318, the locomotion module 323, the planning module 324, the computer-readable medium 313, the haptic feedback device 350, and a vital monitoring device (illustrated with respect to FIG. 5). In some examples, the local monitoring system 390 may implement a machine learning model. Working in conjunction with one or more of the sensors 303A, 303B, the sensor module 302, and/or one or more other modules 313, 314, 318, 320, 322, 323, 324, and 350, the local monitoring system 390 may perform one or more operations, such as one or more operations associated with the elements of a process 600 described with reference to FIG. 6.

Figure 4:
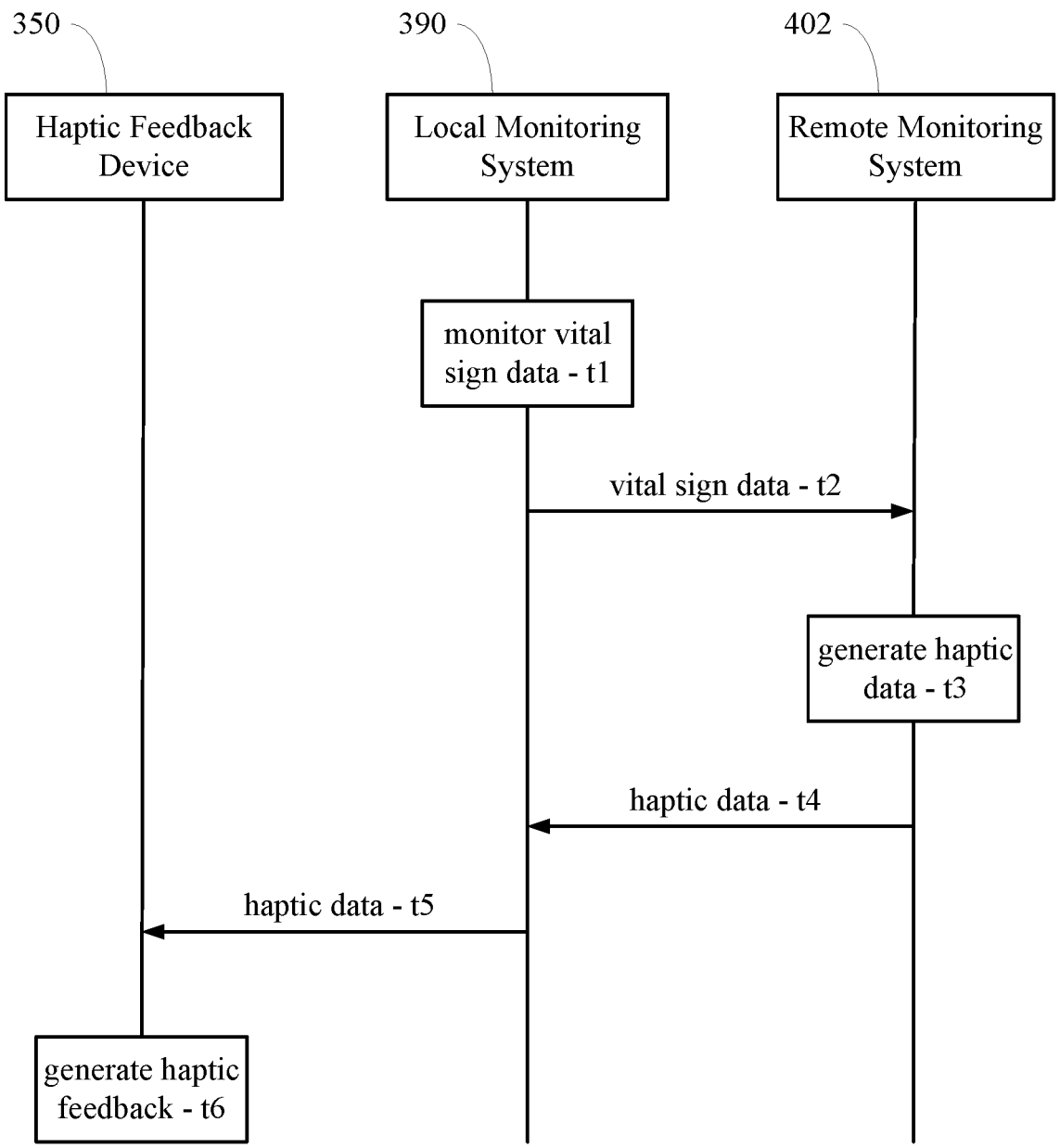
FIG. 4 is a timing diagram illustrating an example of providing haptic feedback to a driver via a haptic feedback system, in accordance with aspects of the present disclosure.

FIG. 4 is a timing diagram illustrating an example of providing haptic feedback to a driver via a haptic feedback system, in accordance with various aspects of the present disclosure. As shown in the example of FIG. 4, the a haptic feedback system may include various devices, such as the haptic feedback device 350 and the local monitoring system 390 illustrated with respect to FIG. 3. In some examples, the local monitoring system 390 and the haptic feedback device 350 may be components of the same device. In other examples, the local monitoring system 390 and the haptic feedback device 350 may be separate devices.

The haptic feedback device 350 may be an example of a wearable device that provides haptic feedback. The wearable device may be worn by the user. The wearable device may be any type of device the provides haptic feedback, such as a haptic feedback vest, a wrist watch, a waist band, or another type of device. In other examples, the local monitoring system 390 and the haptic feedback device 350 may be separate devices. The local monitoring system 390 and the haptic feedback device 350 may communicate with each other via a local bus, a wireless signal, a wired signal, or another type of communication system. The local monitoring system 390 and the remote monitoring system 402 may communicate via wireless communications, such as cellular communication, Wi-Fi communication, or another type of wireless communication protocol.

The remote monitoring system 402 may include one or more devices, such as a tablet, smartphone, personal computer, server, laptop computer, smartwatch, or any other device capable of sending and receiving signals. In some examples, the remote monitoring system 402 may be associated with an application stored on a driving instructor's device, such as a computing device (e.g., laptop computer). As discussed, the remote monitoring system 402 may be in communication with the local monitoring system 390.

As shown in the example of FIG. 4, at t1, the local monitoring system 390 monitors one or more vital signs of a driver, such as the driver's breathing patterns, heart rate, blood pressure, muscle tension, skin conductance, and/or perspiration levels. To monitor the driver's vital signs, the local monitoring system 390 may implement conventional devices and techniques, such as fitness trackers, smartwatches equipped with health sensors, pulse oximeters, blood pressure monitors, cameras, and electrocardiogram (ECG or EKG) devices. Additionally, or alternatively, the local monitoring system 390 may include other types of wearable sensors and/or remote sensors. For example, the local monitoring system 390 may use in-seat sensors, steering wheel sensors, and/or one or more cameras within the vehicle to monitor one or more vital signs. The local monitoring system 390 and/or the remote monitoring system 402 may then use the vital sign data as an indicator of the driver's affective state.

By tracking the driver's vital signs, the local monitoring system 390 and/or the remote monitoring system 402 may determine that one or more vital signs have satisfied a stimulation condition. As an example, the stimulation condition may be satisfied if a respective vital sign is beyond a corresponding threshold. For example, an elevated heart rate often correlates with heightened emotions such as anxiety or excitement. Therefore, the stimulation condition may be satisfied if the heart rate is greater than a BPM threshold. As another example, elevated breathing may also satisfy a stimulation condition. Therefore, the stimulation condition may be satisfied if a number of breathes per second, or other time period, is greater than a breathing pattern rate.

At t2, the local monitoring system 390 transmits the vital sign data to the remote monitoring system 402. The vital sign data includes vital sign information of the one or more monitored vital signs. In some examples, the local monitoring system 390 may continuously transmit the vital sign data to the remote monitoring system 402. In still some examples, the local monitoring system 390 may periodically transmit the vital sign data. For example, the local monitoring system 390 may transmit the vital sign data every five seconds or once the local monitoring system 390 detects that the vital sign data satisfies a transmission condition.

The transmission condition may be satisfied when a monitored vital sign is greater than or less than an associated threshold, wherein the threshold is specific to the vital sign. In some examples, the transmission condition may be satisfied if the driver's heart rate is greater than a first threshold or less than a second threshold. For example, the first threshold may be a first number of BPM and the second threshold may be a second number of BPM. In this example, the transmission condition is satisfied if the driver's heart rate exceeds the first number of BPM or is less than the second number of BPM.

As discussed, the local monitoring system 390 may implement any number of monitoring systems and/or devices to measure vital sign data. It is contemplated that, in addition to or instead of vital sign data, the local monitoring system 390 may transmit some other affective state data to the remote monitoring system 402, where the affective state information may indicate that emotional intervention is needed.

At t3, the remote monitoring system 402 generates haptic feedback data. The haptic feedback data may indicate a rhythm or intensity of vibrations. For example, a remote instructor, equipped with the driver's vital sign data, may initiate strategies to help the driver regulate their emotions and attain a calmer state. One such strategy involves the instructor modifying their own breathing pattern and generating haptic data (e.g., haptic feedback data) associated their breathing pattern to the local monitoring system 390. That is, the haptic data may mimic the instructor's breathing pattern. By adopting slow, controlled breathing techniques, the instructor can demonstrate a sense of relaxation and composure. At t4, the remote monitoring system 402 transmits the haptic data to the local monitoring system 390. It is contemplated that, in addition to or instead of haptic data, the remote monitoring system 402 may transmit, at time t4, audio and/or visual data associated with audio and/or visual cues. The haptic data, audio data, and/or visual data be referred to as intervention data.

At t5, the local monitoring system 390 transmits the haptic data to the haptic feedback device 350. At t6, the haptic feedback device 350 generates haptic feedback based on the haptic data. In some examples, the haptic feedback device 350 may generate subtle vibrations or rhythms based on the haptic data. For example, the haptic feedback device 350 may transmit vibrations that correspond to a driving instructor's breathing patterns. The haptic feedback device 350 may be embedded in a wearable device or integrated into a vehicle component, such as a driver seat, headrest, or seatbelt. Additionally, or alternatively, the haptic feedback device 350 may play soothing sounds, such as soothing music or natural audio, based on data received from the local monitoring system 390. Additionally, or alternatively, the haptic feedback device 350 may also provide visual cues to the driver based on data received from the local monitoring system 390, such as a video or image illustrating proper breathing techniques.

The haptic feedback device 350 may continue to generate haptic feedback until one or more stop conditions are satisfied. In some examples, the local monitoring system 390 may continue to monitor the driver's vital signs. In response to the local monitoring system 390 detecting that the driver's vital signs have returned to a baseline or within range of a baseline, the local monitoring system 390 may signal the haptic feedback device 350 to stop generating haptic feedback. For example, if the driver's heart rate (e.g., BPM) returns to within a specified range, the local monitoring system 390 may signal the haptic feedback device 350 to stop generating haptic feedback.

Similarly, the remote monitoring system 402 may signal the local monitoring system 390 and/or the haptic feedback device 350 to stop generating haptic feedback in response to vital sign data received from the local monitoring system 390 indicating that the driver's vitals have returned to within a baseline. Additionally, or alternatively, the stop condition may be based on one or more conditions other than the driver's vitals. For example, the haptic feedback device 350 may generate haptic feedback until a specified amount of time has passed or the driver requesting to stop the haptic feedback, for example, by providing an input to stop the haptic feedback. The input may be received at an input device (e.g., a button or switch) on the haptic feedback device 350.

It is also contemplated that various aspects of the present disclosure may be implemented to regulate a driver in ways other than calming the driver. For example, the local monitoring system 390 may detect the driver falling asleep, and, in response, the remote monitoring system 402 may generate haptic data in order to rouse the driver. In this example, the driver may wake up in response to receiving haptic feedback from the haptic feedback device 350. Additionally, the vibrations, sounds, and/or visual cues generated by the haptic feedback device 350 may be based on intervention data received from the remote monitoring system 402, such as haptic data, or may be based on predefined data stored by the local monitoring system 390 or another device in communication with the with the local monitoring system 390. For example, the haptic data may indicate the rhythm of a vibration pattern while the intensity of the vibration pattern is already specified in the haptic feedback device 350. As discussed, data generated by the remote monitoring system 402 may additionally or alternatively be associated with different aspects of the vibrations, sounds, and/or visual cues themselves. For example, data transmitted by the remote monitoring system 402 may include both the intensity and rhythm of a vibration pattern, as well as sounds to be conveyed to the driver.

Furthermore, the haptic feedback device 350, local monitoring system 390, and remote monitoring system 402 may be personalized to cater to individual driver preferences. For example, the haptic feedback device 350 may offer adjustable intensity levels, allowing the driver or instructor to choose the degree of haptic feedback the driver or instructor finds most effective in achieving affect regulation. Additionally, the driver or instructor may choose sensory stimuli conveyed by haptic feedback device 350, such as sounds or visual cues to complement the haptic feedback and create a more immersive and calming experience.

Although the example illustrated with respect to FIG. 4 is described with respect to a driver and a driving instructor, other users are contemplated. For example, the haptic feedback device 350 may be embedded in a passenger seat of a car. In this example, the haptic feedback device 350 may provide haptic feedback to soothe a passenger in a car. Similarly, the haptic feedback device 350 may play calming sounds or display instructional images to an excited passenger. Although the example illustrated with respect to FIG. 4 illustrates three components, the haptic feedback device 350, local monitoring system 390, and remote monitoring system 402, these components serve as an example. For instance, it is contemplated that more than two monitoring systems may be implemented to perform aspects of the present disclosure. It is also contemplated that the haptic feedback device 350 and the local monitoring system 390 may be incorporated into a single device, e.g., the wristwatch illustrated with respect to FIG. 5.

FIG. 5 illustrates an example of a driver 500 wearing a vital monitoring device, in accordance with aspects of the present disclosure. As illustrated in FIG. 5, the vital monitoring device may be a wristwatch 502. The vital monitoring device may include one or more components to measure vital signs, such as a heart rate monitor. In some examples, the vital monitoring device may be coupled to the haptic feedback device 350 (not shown in the example of FIG. 5) and/or the local monitoring system 390 (not shown in the example of FIG. 5) described with respect to FIG. 3. For example, the wristwatch 502 may include the vital monitoring device, the local monitoring system 390, and the haptic feedback device 350.

Although the example illustrated with respect to FIG. 5 shows the vital monitoring device as a wristwatch 502, other configurations are contemplated. The vital monitoring device, local monitoring system 390, and haptic feedback device 350 may be coupled to or integrated with one or more components, such as a seat 504, seatbelt (not shown in FIG. 5), headrest 506, steering wheel, floorboard, or user attire 510. For example, the vital monitoring device may be a heart monitor attached to a seatbelt. In this example, the haptic feedback device 350 may be a driver's seat 504 configured to vibrate. The local monitoring system 390 in this example may include or be in communication with the heart monitor, driver's seat 504, and one or more other components, such as the processor 320 described with reference to FIG. 3.

Figure 6:
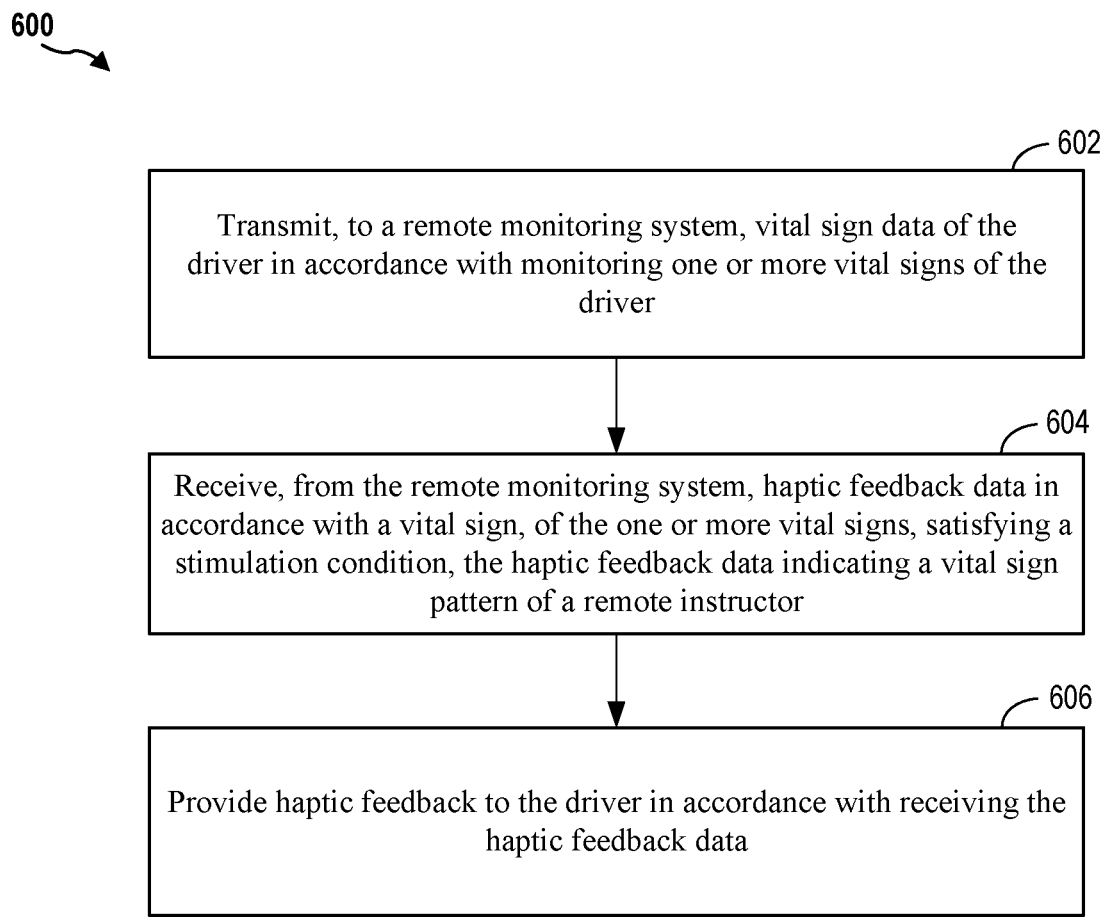
FIG. 6 is a flow diagram illustrating an example process for regulating an affective state of a driver, in accordance with aspects of the present disclosure.

FIG. 6 is a flow diagram illustrating an example process for regulating an affective state of a driver, in accordance with some aspects of the present disclosure. The example process 600 is performed by one or both of a local monitoring system 390 or a haptic feedback device 350 as described with respect to FIGS. 3 and 4. As shown in FIG. 6, the process 600 begins at block 602 transmitting, to a remote monitoring system, vital sign data of the driver in accordance with monitoring one or more vital signs of the driver. The one or more vital signs may include, for example, heart rate, breathing patterns, pupil dilation, blood pressure, muscle tension, skin conductance, or perspiration levels. At block 604, the process 600 receives, from the remote monitoring system, haptic feedback data in accordance with a vital sign, of the one or more vital signs, satisfying a stimulation condition, the haptic feedback data indicating a vital sign pattern of a remote instructor. For example, the vital sign pattern may be a breathing pattern demonstrated by the remote instructor. At block 606, the process 600 provides haptic feedback to the driver in accordance with receiving the haptic feedback data. As discussed, the haptic feedback may be provided by the haptic feedback device 350.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the detailed description. The detailed description and drawings are merely illustrative of the present disclosure rather than limiting, the scope of the present disclosure being defined by the appended claims and equivalents thereof.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor specially configured to perform the functions discussed in the present disclosure. The processor may be a neural network processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. Alternatively, the processing system may comprise one or more neuromorphic processors for implementing the neuron models and models of neural systems described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for regulating an affective state of a driver, comprising:
    transmitting, to a remote monitoring system, vital sign data of the driver in accordance with monitoring one or more vital signs of the driver;
    receiving, from the remote monitoring system, haptic feedback data in accordance with a vital sign, of the one or more vital signs, satisfying a stimulation condition, the haptic feedback data indicating a vital sign pattern of a human instructor remotely located from the driver; and
    providing haptic feedback to the driver in accordance with receiving the haptic feedback data.

2. The method of claim 1, wherein the one or more vital signs include a heart rate, a breathing pattern, a pupil dilation level, a blood pressure level, muscle tension, skin conductance, or a perspiration level.

3. The method of claim 1, wherein the vital sign pattern is a breathing pattern.

4. The method of claim 1, wherein the one or more vital signs are monitored via one or more sensors incorporated within a vehicle and/or one or more wearable devices.

5. The method of claim 1, wherein the haptic feedback is provided via a wearable device or by a vehicle component.

6. The method of claim 1, wherein the vital sign data is continuously or periodically transmitted.

7. The method of claim 1, wherein the vital sign data is transmitted based on at least one of the one or more vital signs satisfying a transmission condition.

8. An apparatus for regulating an affective state of a driver, comprising:
    one or more processors; and
    one or more memories coupled with the one or more processors and storing instructions operable, when executed by the one or more processors, to cause the apparatus to:
        transmit, to a remote monitoring system, vital sign data of the driver in accordance with monitoring one or more vital signs of the driver;
        receive, from the remote monitoring system, haptic feedback data in accordance with a vital sign, of the one or more vital signs, satisfying a stimulation condition, the haptic feedback data indicating a vital sign pattern of a human instructor remotely located from the driver; and
        provide haptic feedback to the driver in accordance with receiving the haptic feedback data.

9. The apparatus of claim 8, wherein the one or more vital signs include a heart rate, a breathing pattern, a pupil dilation level, a blood pressure level, muscle tension, skin conductance, or a perspiration level.

10. The apparatus of claim 8, wherein the vital sign pattern is a breathing pattern.

11. The apparatus of claim 8, wherein the one or more vital signs are monitored via one or more sensors incorporated within a vehicle and/or one or more wearable devices.

12. The apparatus of claim 8, wherein the haptic feedback is provided via a wearable device or by a vehicle component.

13. The apparatus of claim 8, wherein the vital sign data is continuously or periodically transmitted.

14. The apparatus of claim 8, wherein the vital sign data is transmitted based on at least one of the one or more vital signs satisfying a transmission condition.

15. A non-transitory computer-readable medium having program code recorded thereon for regulating an affective state of a driver, the program code executed by at least one processor and comprising:
    program code to transmit, to a remote monitoring system, vital sign data of the driver in accordance with monitoring one or more vital signs of the driver;
    program code to receive, from the remote monitoring system, haptic feedback data in accordance with a vital sign, of the one or more vital signs, satisfying a stimulation condition, the haptic feedback data indicating a vital sign pattern of a human instructor remotely located from the driver; and
    program code to provide haptic feedback to the driver in accordance with receiving the haptic feedback data.

16. The non-transitory computer-readable medium of claim 15, wherein the one or more vital signs include a heart rate, a breathing pattern, a pupil dilation level, a blood pressure level, muscle tension, skin conductance, or a perspiration level.

17. The non-transitory computer-readable medium of claim 15, wherein the vital sign pattern is a breathing pattern.

18. The non-transitory computer-readable medium of claim 15, wherein the one or more vital signs are monitored via one or more sensors incorporated within a vehicle and/or one or more wearable devices.

19. The non-transitory computer-readable medium of claim 15, wherein the haptic feedback is provided via a wearable device or by a vehicle component.

20. The non-transitory computer-readable medium of claim 15, wherein:

the vital sign data is continuously or periodically transmitted; and the vital sign data is transmitted based on at least one of the one or more vital signs satisfying a transmission condition.

\* \* \* \* \*